United States Patent [19]

Gerber

[11] Patent Number: 4,915,319

[45] Date of Patent: Apr. 10, 1990

[54] PROGRESSIVE PLOTTER WITH BRAKE FOR SUPPLY ROLL

[75] Inventor: Heinz J. Gerber, West Hartford, Conn.

[73] Assignee: Gerber Garment Technology, Inc., Tolland, Conn.

[21] Appl. No.: 260,822

[22] Filed: Oct. 21, 1988

[51] Int. Cl.⁴ .......................................... B65H 23/08
[52] U.S. Cl. ............................ 242/67.3 R; 242/75.4; 346/136
[58] Field of Search ................ 242/67.3 R, 75.4, 68.4, 242/75; 346/136, 139 R, 139 A, 139 B; 33/1 M, 32.4

[56] References Cited

U.S. PATENT DOCUMENTS

| | | | |
|---|---|---|---|
| 3,009,665 | 11/1961 | Umrath | 242/75.4 X |
| 3,197,153 | 7/1965 | Davidson | 242/75.4 X |
| 3,531,057 | 9/1970 | Way | 242/75.4 X |
| 3,825,202 | 7/1974 | Robinson | 242/67.3 R X |
| 3,974,974 | 8/1976 | Nishikawa | 242/75.4 X |
| 4,550,558 | 11/1985 | Bouffard et al. | 242/75.4 X |
| 4,550,885 | 11/1985 | Graham | 242/75.4 X |
| 4,610,407 | 9/1986 | Stubbmann | 242/75.4 X |
| 4,630,071 | 12/1986 | Nakazawa | 346/136 |
| 4,646,984 | 3/1987 | Falstrup | 242/75.4 X |

Primary Examiner—John M. Jillions
Attorney, Agent, or Firm—McCormick, Paulding & Huber

[57] ABSTRACT

A friction brake used in association with a supply roll in a device advancing sheet material from a supply roll onto a take-up roll. The brake comprises a shaft supported by a plate and having a head at one end and a threaded portion at the other. A journalling part, a reverse bias arm, and a friction washer interposed between the arm and journalling part are each rotatably supported on the shaft and are biased together by axial adjustment means positioned adjacent the shaft threaded end portion. The axial adjustment means cooperates against one side of the plate to clamp the rotatably supported members against the plate other side. The reverse bias arm creates on the supply roll a drag when sheet material is pulled and subsequently delivers to the supply roll a reverse bias force after the pulling of material stops.

18 Claims, 5 Drawing Sheets

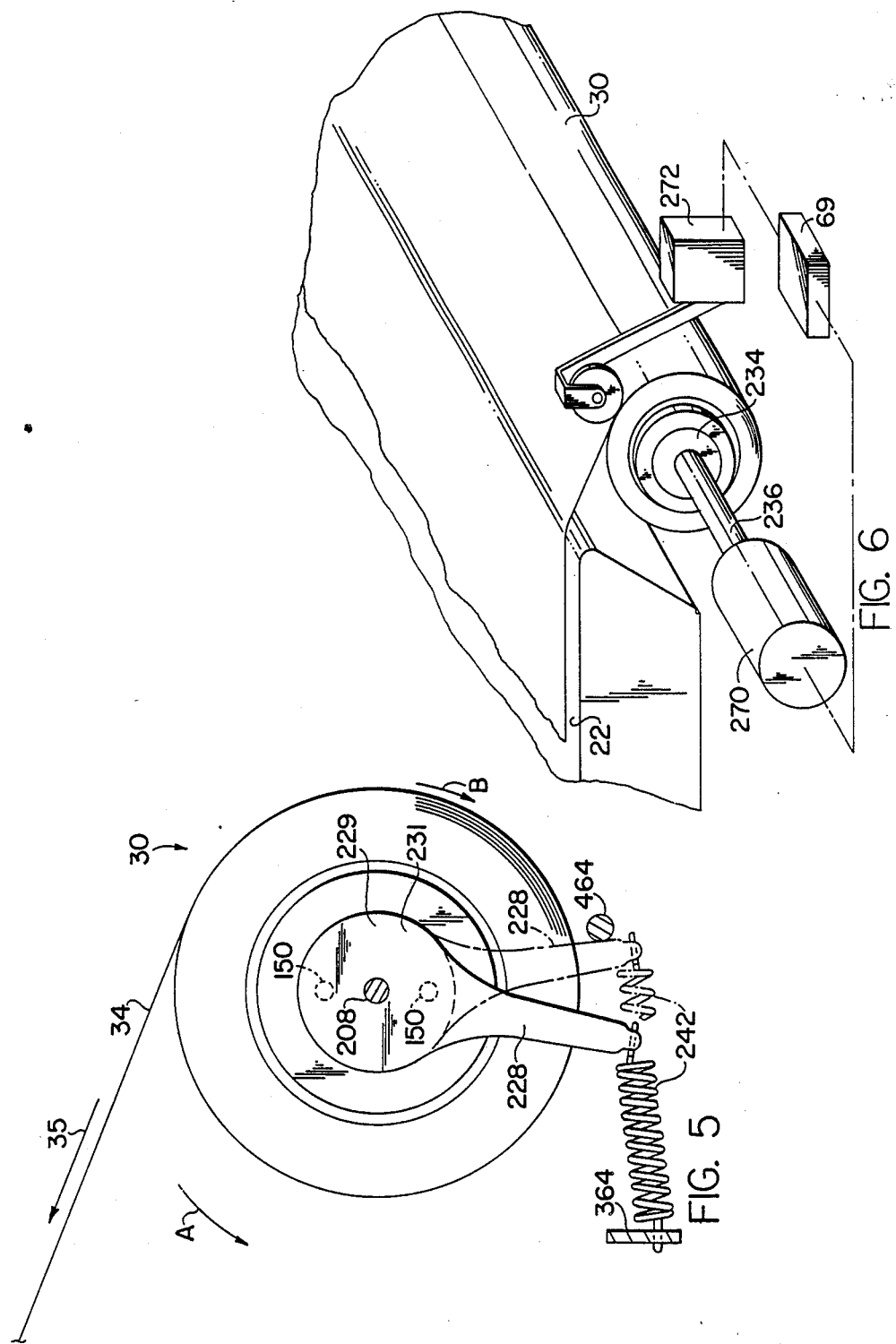

PROGRESSIVE PLOTTER WITH BRAKE FOR SUPPLY ROLL

CROSS REFERENCE TO RELATED APPLICATION

The present invention relates to copending U.S. patent application Ser. No. 195,128 entitled PROGRESSIVE PLOTTER WITH UNIDIRECTIONAL PAPER MOVEMENT filed on May, 17, 1988 by the same inventor of the present invention.

BACKGROUND OF THE INVENTION

This invention relates to a plotter or a similar device wherein sheet material from a supply roll is moved over a supporting surface and figures, characters and other graphics are drawn segment-by-segment on the sheet material by a drawing instrument as the sheet material is intermittently advanced segment-by-segment over the supporting surface, and deals more particularly with a simple arrangement, including a brake for the supply roll, assuring accurate positioning of the sheet material at the end of an advancement, and the maintenance of that position until the start of the next advancement, to secure an accurate matching of the drawing segment drawn on each sheet material segment with the drawing segments drawn on adjacent sheet material segments.

In the plotter of copending patent application Ser. No. 195,128 paper is pulled from the supply roll by a gear motor which drives a paper take-up roll. A displacement sensing disk engages the paper, is rotated as the paper moves and has its rotational displacement sensed to provide an indication of the paper displacement. During an advancement, when the disk indicates the advancement is nearly completed the speed of the take-up motor is slowed, and then when the disk indicates the advancement is entirely complete the take-up motor is stopped. For good matching of the drawing segment-by-segment, at the instant the take-up motor is stopped the movement of the paper should also stop and its position relative to the supporting surface at that instant should also be held until the start of the next advancement.

In the copending patent application Ser. No. 195,128 a friction disk engaging one end of the supply roll is disclosed for applying a force opposing the unwinding of paper from the supply roll so that the paper is kept in tension as it is pulled off of the supply roll and so that the supply roll will stop immediately without overshoot when the take-up motor stops. When the take-up motor does stop, a certain amount of energy is stored in spring-like fashion between the rotor of the take-up motor and the segment of paper on the supporting surface. Under good conditions this stored energy is resisted by the friction force applied to the supply roll so that the stretch of paper existing between the rolls remains stationary and in tension. However, if the friction force applied to the supply roll is initially too small, or if such friction force though initially sufficient becomes lost, as through vibration of the plotter, the stored energy may act to draw a small amount of additional paper from the supply roll and thereby shift the paper a small amount relative to the supporting surface causing it to lose its previously accurately determined position.

In particular, it has been found that the effectiveness of the friction disk of the copending application relies to a great degree upon the ability to have the side edges of the wound paper of the supply roll aligned with one another to form a uniformily flat end surface for the roll. But, commercially wound rolls of paper often do not have perfectly flat end surfaces. Therefore, the desired friction force may not always be developed, and further if the end surface of the roll is momentarily displaced from the friction disk, through vibration of the plotter, the friction force may be partially or entirely lost.

Accordingly, it is an object of the present invention to provide in a plotter such as aforesaid means by which paper or similar sheet material may be pulled from the supply roll under tension independently of the existence of a perfectly flat end surface on the roll, and whereby at the end of an advancement the sheet material movement is stopped simultaneously with the stopping of the take-up motor and its position held fixed until the start of the next advancement against the force of energy stored between the paper on the support surface and the take-up motor which stored energy holds the stretch of paper existing between the two rolls in tension.

Another object of the invention is to provide a simple friction brake construction for use with the supply roll which in cooperation with the other parts of the plotter during an advancement exerts a retarding or reverse biasing force on the supply roll causing the paper to be pulled from the supply roll under tension, and which at the end of an advancement continues to apply a reverse bias to the supply roll sufficient to hold the paper stationary and in tension against the spring forces stored in the drive train between the paper on the support surface and the rotor of the take-up motor.

Other objects and advantages of the present invention will be apparent from the following description of a preferred embodiment and from the accompanying drawings and claims.

SUMMARY OF THE INVENTION

The invention resides in a plotter with paper supply and take-up rolls and a means for accurately advancing paper from the supply roll to the take-up roll and over a supporting surface in segment-by-segment fashion. A take-up motor rotates the take-up roll. A sensor senses the displacement of the paper relative to the support surface during an advancement. At the end of an advancement, that is when a predetermined amount of paper displacement is sensed, the take-up motor is stopped. A brake applies a retarding force or reverse bias to the supply roll during the advancement. At the end of the advancement, from the instant the take-up motor is stopped, the brake also continues to apply a reverse bias to the supply roll to hold the paper in tension and stationary relative to the supporting surface until the start of the next advancement.

The invention also resides in the brake being a friction brake comprised of a shaft supported by the frame of the plotter with its longitudinal axis aligned with the axis of the supply roll. A journalling part is supported by the shaft adjacent the adjacent end of the supply roll and is releasably connected with a plug fixed in the core of the supply roll so as to radially support the adjacent end of the supply roll and to rotate with it. A reverse bias member is rotatably supported on the shaft and has a head portion surrounding the shaft and a radially outwardly extending arm portion. A pair of coengaging friction surfaces arranged in a plane orthogonal to the shaft are located between the reverse bias member and the journalling part and an adjustable pressure means is provided for urging the two friction surfaces into coengagement. The friction surfaces are further so arranged that during rotation of the supply roll one surface is fixed to and rotates with the supply roll and the other friction surface is fixed to the reverse bias member. The reverse bias member has a neutral position about the axis of the shaft and is spring biased so as to be yieldingly movable away from such neutral position in the direction of unwinding rotation of the supply roll. The movement of the reverse bias member in the unwinding direction of the supply roll is limited by a stop. Therefore, during an advancement of paper the reverse bias member first moves with the roll to its limited position, if not already in such a limited position, and during such movement the force of the biasing spring yieldingly resists such movement and exerts a reverse bias force on the supply roll. After the limited position is reached the two friction surfaces move relative to one another and create a friction force continuing to apply a reverse bias torque to the supply roll. At the end of an advancement and immediately upon the stopping of the take-up motor the spring bias applied to bias member again exerts a reverse bias on the supply roll.

BRIEF DESCRIPTION OF THE DRAWINGS

FIG. 5 is a vertical sectional view taken along line 5—5 of FIG. 4 and illustrates in dotted line the operation of the friction brake of the present invention.

FIG. 6 is a schematic view of another embodiment of the invention.

DETAILED DESCRIPTION OF THE PREFERRED EMBODIMENT

Figure 1:
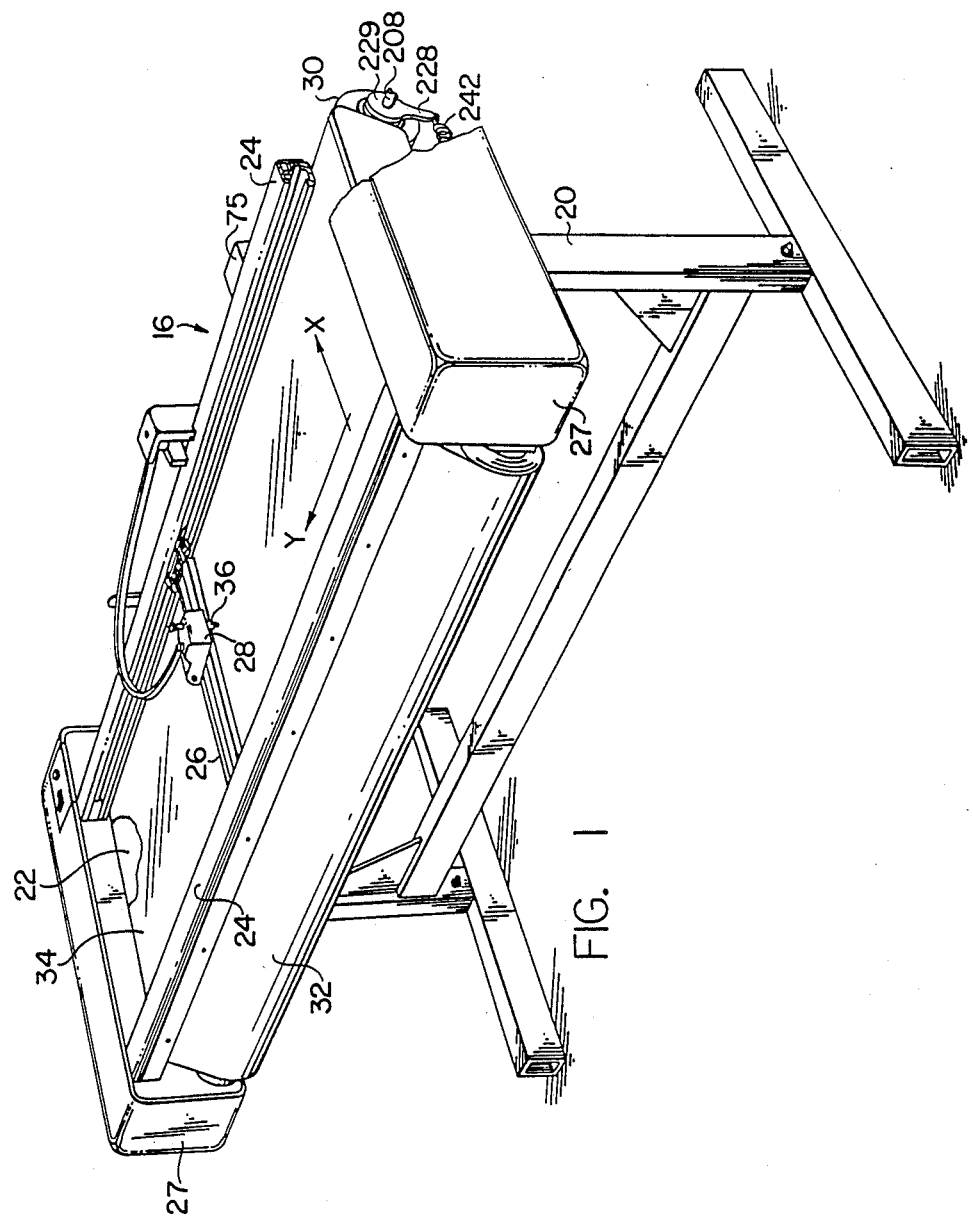
FIG. 1 is a perspective view of a plotter embodying the friction brake of the present invention shown in partial cut away view.
Figure 2:
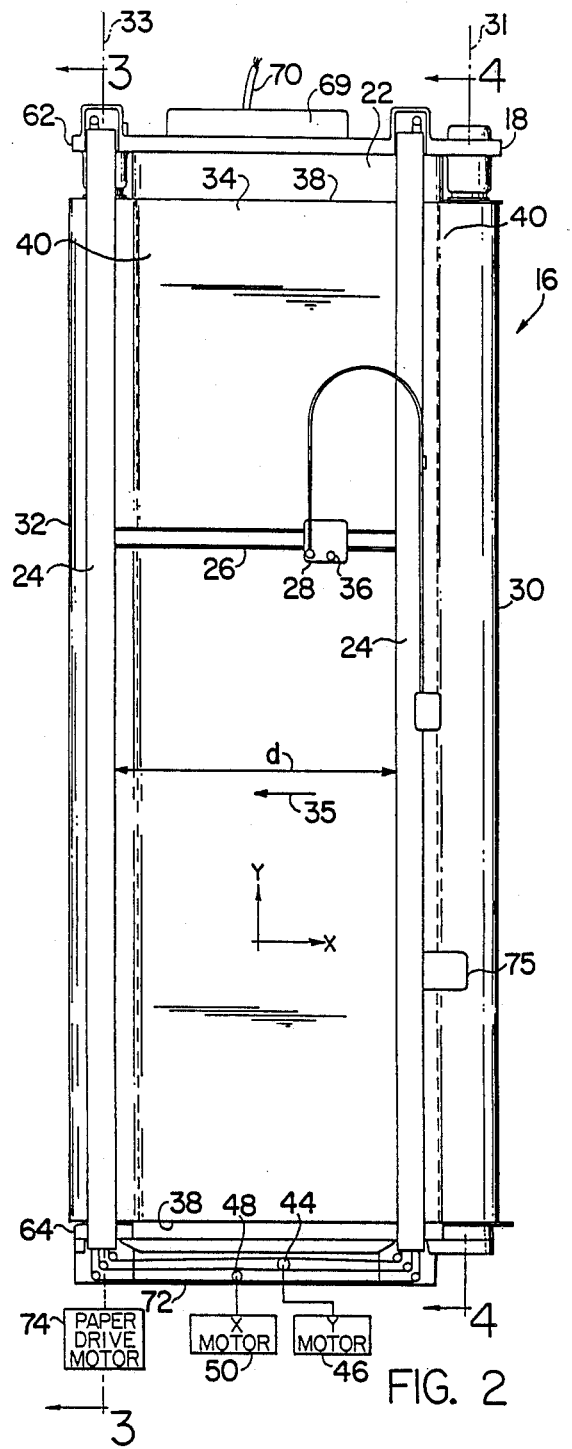
FIG. 2 is a plan view of the plotter of FIG. 1 with the end covers removed.

Turning to the drawings, and first referring to FIGS. 1 and 2, a progressive plotter embodying the invention is there generally shown by the reference numeral 16. It is made up basically of a table 18 having a suitable base structure 20 and an upwardly facing support surface 22, two parallel guide rails 24, 24, an elongated Y carriage 26 movable along the guide rails 24, 24 in the illustrated Y coordinate direction, and a pen or X carriage 28 movable along the Y carriage 26 in the illustrated X coordinate direction. In FIG. 1 the plotter is shown with portions of one of the two end covers 27, 27 and guide rails 24, 24 removed to reveal the positioning of the supply roll relative the support surface 22 in order to more clearly illustrate the invention.

As best seen in FIG. 2, the table 18 includes at its right-hand side means for removably supporting a supply roll 30 of paper for rotation about its central axis 31, and also includes means adjacent its left-hand side for removably supporting a take-up roll 32 of paper for rotation about its central axis 33. Paper 34 from the supply roll 30 is guided over the support surface 22 and wound upon the take-up roll 32 as explained in more detail hereinafter. A paper drive motor 74 rotates the take-up roll 32 to wind paper onto it pulling paper from the supply roll and moving the paper in the direction 35 extending parallel to the longitudinal axis of the paper. A lengthwise section of the paper is supported by the support surface 22 and may be drawn upon by a pen 36 carried by the pen carriage 28.

The plotter 16 is particularly adapted to the making of long drawings such as markers for the garment industry even though the plotting area has a dimension along the length of the drawing which is usually many times smaller than the drawing length. For example, in a given instance the paper 34 may have a width of 80 inches and a drawing made on the paper 34 may have a length of 30 to 50 yards or more. The support surface 22 is rectangular in shape and defined by two end edges 38, 38 and two side edges 40, 40 each having a relatively small radius of curvature, such as of less than one inch and preferably of less than one-half inch. The major part of the support surface 22 is a plotting area defined by the combined ranges of movement of the pen 36 in the X and Y coordinate directions.

The guide rails 24, 24, in addition to being fixed relative to the support surface 22 and extending perpendicular to the direction 35 of paper movement, are spaced closer to one another than the width of the paper 34 or of the range of movement of the pen parallel to the Y coordinate axis. Preferably they are spaced from one another by a distance d, as shown in FIG. 2, which is at least less than one half, or several times less than, the width of the paper 34. For example, in a specific instance, the paper 34, as mentioned, has a width of 80 inches. The support surface 22 between the edges 38, 38 has a width of about 85 ¼ inches and between the side edges 40, 40 has a length of about 24 ¾ inches. The pen 36 has a range of movement of 80 inches in the Y coordinate direction, which coincides with the width of the paper 34, and a range of movement of about 17 inches in the X coordinate direction, thereby defining on the support surface 22 a plotting area of approximately 17×80 inches. The distance d between the two side rails 24, 24 is approximately 22 ¾ inches, which means the guide rail spacing d is approximately 3 ½ times less than the width of the paper 34 and of the associated plotting area of the support surface 22. The Y carriage 26 is elongated so as to extend between the two guide rails 24, 24, but the short spacing between the guide rails means that this carriage can be made of relatively small size and of light weight, and can be easily supported and guided at its two ends by the rails 24, 24 while still being made sufficiently resistant to vibrations and deflections to avoid plotting errors. Likewise the pen carriage 28 may also be made of a relatively small size and of light weight. The small size and light weight of the carriages 26 and 28 further allows them to be made of relatively inexpensive construction and to be driven at acceptable accelerations and decelerations by relatively low powered and inexpensive motors.

Various different means may be used for guiding and moving the carriages 26 and 28 in the Y and X coordinate directions respectively without departing from the invention. For example, as indicated in FIG. 2, the two carriages may be driven by generally conventional cable drives including a Y cable drum 44 driven by a Y motor 46 and an X cable drum 48 driven by an X motor 50.

As shown in FIG. 2, an end plate 62 supports a control unit 69 which includes a digital processor, servo amplifiers and other electronic components as needed for control of the plotter, the unit 69 being connectable to other parts of a computer assisted marker making and grading system or the like through a cable 70. In particular, data defining drawings to be created by the plotter is supplied to it through the cable 70. This data is then processed by the processor and converted into commands subsequently delivered to the Y motor 46, the X motor 50 and the take-up roll drive motor 74 to control the movement of the pen and the paper in such a way as to cause the pen to draw the drawings represented by the data on the paper. Further, an end plate 64 as shown in FIG. 2 includes a bracket 72 supporting the X and Y table drums 48 and 44 and the associated X and Y motors 50 and 46. The same end plate also supports the paper drive motor 74 for driving the take-up roll 32 as explained in more detail hereinafter.

As previously stated, the take-up roll 32 is rotated to wind paper onto it and pull paper from the supply roll 30 thereby moving the paper in the direction 35 in FIG. 2. The paper is further moved in a segment-by-segment intermittent fashion over the support surface 22. That is, after a segment of a drawing is drawn on the portion of the paper supported by the support surface 22 the take-up roll is rotated by the drive motor 74 to advance a new segment of paper to the support surface, and then a new segment of the drawing is drawn on that segment of the paper. The length of paper advanced during each such advancement is measured and controlled by a paper displacement sensor 75. This sensor may take various different forms, but preferably is the same as the sensor shown in copending patent application Ser. No. 195,128. This sensor has a rotatable disk which engages the paper and is rotated by it as it is advanced. A detecting means then detects the rotational displacement of the disk to provide an indication of the paper displacement. A given length of paper is preestablished as the amount of paper to be displaced during each advancement. At the start of each advancement the paper drive motor 74 is turned on and rotates at a substantially constant speed throughout most of the advancement. When the sensor 75 detects that the end of the advancement is near, the speed of the motor 75 is slowed. Then, when the sensor 75 detects the end of the advancement the paper drive motor 74 is stopped. Since the drive motor is stopped at the instant the sensor 75 indicates the end of the advancement, it is important for proper matching of the segments of the drawing with one another that the movement of paper over the support surface 22 stop immediately with the stopping of the drive motor 74 and that its position relative to the support surface be held stationary until the start of the next advancement. For this purpose, in accordance with the invention and as explained in more detail hereinafter, a brake is associated with the supply roll which applies a retarding force to the supply roll during an advancement to maintain the paper and which brake at the end of the advancement maintains a reverse biasing force on the supply roll until the next advancement to hold the paper in the support surface 22 stationary and in tension against forces developed by energy stored in spring-like fashion between the paper on the support surface and the rotor of the drive motor 74.

Figure 3:
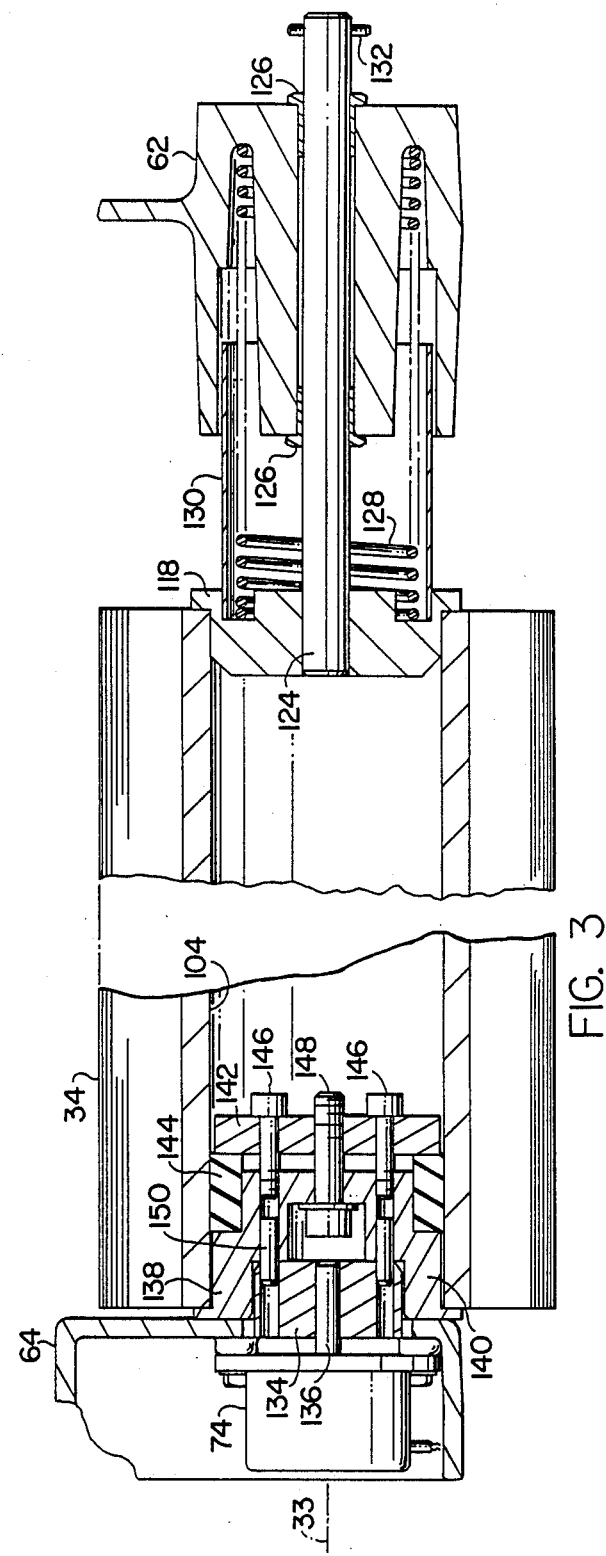
FIG. 3 is a fragmentary vertical sectional view taken along line 3—3 of FIG. 2 showing the supporting and drive means for the sheet material take-up roll.

The means for removably and rotatably supporting and driving the take-up roll 32 is shown in FIG. 3. Referring to this figure the take-up roll 32, similarly to the supply roll 30, is of the type having a tubular central core 104 onto which the paper 34 is wound. The left-hand end of the roll is removably coupled to the paper drive motor 74 by a two-part coupling consisting of a cylindrical part 134 fixed to the drive shaft 136 of the motor and an expandable plug 138 removably fixed to the tube 104 of the roll. The expandable plug 138 is inserted into and fixed to the core 104 before the roll 32 is loaded onto the plotter. It consists of two parts 140 and 142 of generally cylindrical construction between which is received a compressible annular body 144 of neoprene or the like. The inner part 142 is supported for axial movement relative to the outer part 140 by two screws 146, 146 threaded into the outer part 140 and slidably passing through the inner part 142. Another screw 148 having a head received in a central recess of the outer part 140 loosely passes through the part 140 and is threaded into the inner part 142. Therefore, by rotating the central screw 148 the inner part 142 may be moved toward or away from the outer part to compress or decompress the annular body 144, increasing or decreasing its diameter, to cause it to grip or release the inner surface of the tube 104. The plug 138 is first inserted into the associated end of the tube 104 with the body 144 in a generally decompressed state. Then the screw 148 is rotated to move the part 142 toward the part 140 to increase the diameter of the body 144 and cause the plug 138 to become non-rotatably fixed to the tube. The plug 138 is then moved into coupled relationship with the part 134 at which a driving connection is made between the part 134 and the plug 138. To effect such driving connection the plug 138 has fixed to it two pins 150, 150 which slidably enter conforming holes in the part 134.

The opposite or right-hand end of the take-up roll 32 is rotatably supported and spring biased toward the left by plug 118. The plug 138 is supported for rotation about the central axis 33 of the roll 32, and also for limited axial movement along such axis, by a shaft 124 supported by the end plate 62 through two bearings 126, 126. A helical spring 128, which at one end engages the plug 118 and at its other end engages the end plate 62, surrounds the shaft 124. A cylindrical shield 130 is fixed to the plug 118 and extends over a portion of the length of the spring 128. The spring 128 works as a compression spring and urges the plug 118 to the left as seen in FIG. 3 to insure continual seating of the plug 118 within the tube 104. Leftward movement of the plug is limited by a pin 132 carried by the right-hand end of the shaft 124 and engagable with the end plate 62 in the limit position. Rightward movement of the plug 118 is limited by engagement of the right-hand end of the shield 130 with the end plate 62. Such limited range of axial movement of the plug 118 is sufficient to allow removal and replacement of a supply roll from and to the plotter. In the removal of the roll 30 the roll is manually pushed to the right as seen in FIG. 3 to compress the spring 128 until the opposite end of the roll moves free of the part 134. The end of the roll adjacent the part 134 is then swung laterally until it is out of the way of the part 134 and other parts of the plotter, and it is then moved generally axially to the left to remove the right-hand end from the plug 118. A reverse procedure is used in loading a new take-up roll onto the plotter.

In accordance with the invention, a friction brake is provided at the supply roll 30 support such that during the unwinding of paper from the supply roll by the motor 74, a force is applied to the roll opposing its unwinding rotation so that the portion of paper existing between the rolls 30 and 32 is kept in tension and when the rotation of the take-up roll is stopped by stopping the drive motor 74, a reverse bias force or torque will continue to be applied to the supply roll 30 so that the roll will immediately stop without overshoot, with the back-biasing effect remaining until the start of the next advancement.

Figure 4:
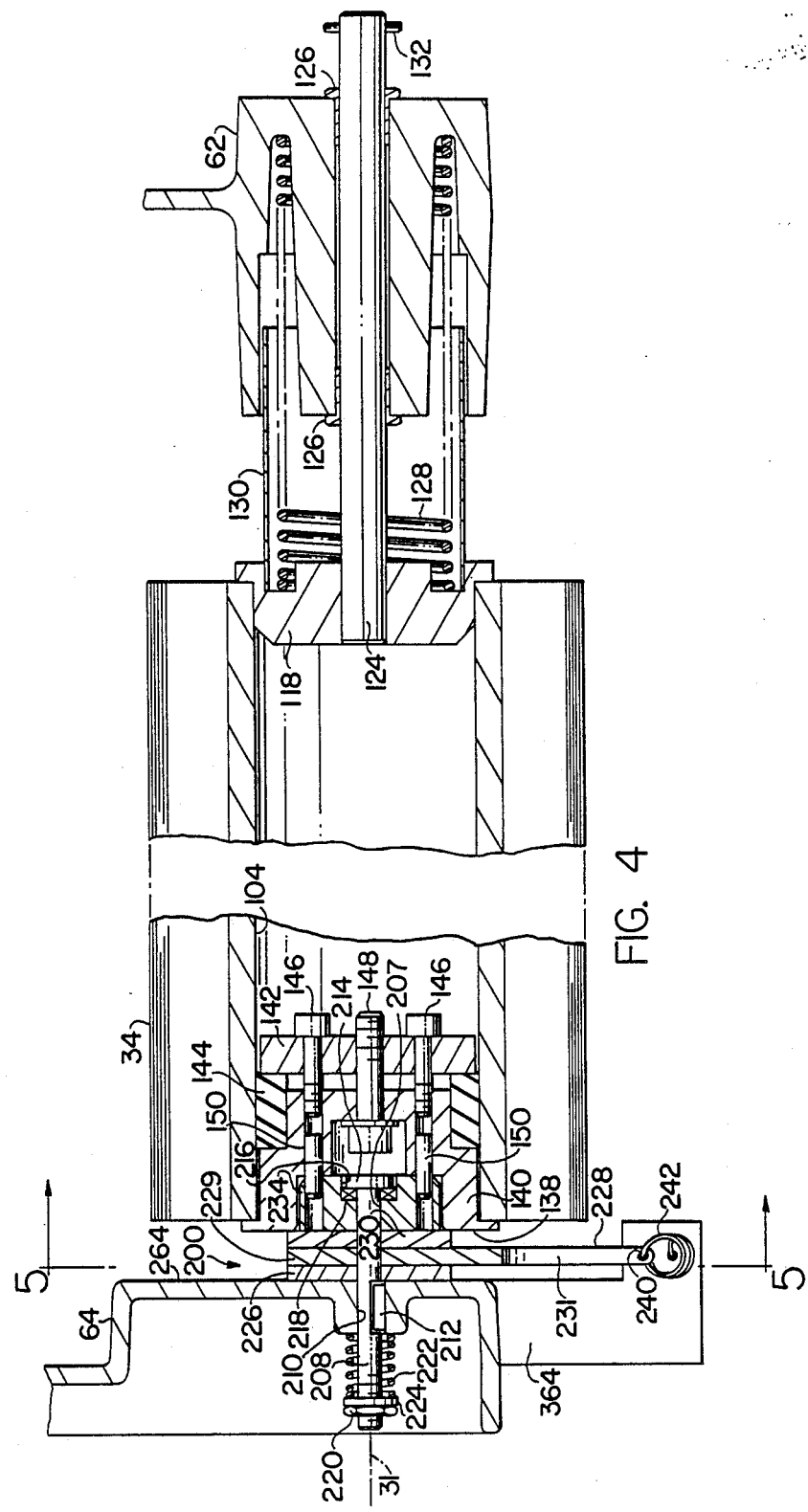
FIG. 4 is a fragmentary vertical sectional view taken along line 4—4 of FIG. 2 showing the friction brake of the present invention in association with the sheet material supply roll.

As is shown in FIG. 4, the illustrated friction brake 200 is employed with the supply roll 30 of the type having a tubular central core 104 of cardboard or the like onto which the paper 34 is wound. At its right-hand end, as seen in FIG. 4, the roll is rotatably slidably supported by means very similar to that used to support the right-hand end of the take-up roll 32. In particular, the plug 118 when inserted into the core 104 supports the supply roll 30 at its right-hand end for rotation about axis 31 of the roll 30 on the shaft 124 fixedly supported by the end plate 62 on the bearings 126, 126.

The opposite left-hand end of the supply roll 30 shown in FIG. 4 is removably and rotatably coupled to the friction brake 200 by a two-part coupling consisting of a journalling part 234 and an expandable plug 138. The expandable plug 138 is identical to that previously discussed with regard to FIG. 3 in that it consists of the inner part 142, the outer part 140, the compressible annular body 144 and the central screw 148 biasing the body 144 between parts 140 and 142 to secure the plug 138 within the core 104. The journalling part 234 and the plug 138 are nonrotatably coupled with one another by the two pins 150, 150 fixed to the plug 138 which slidably enter conforming holes in the part 234 when the left-hand end of the supply roll 30 is moved into coupled relationship with the journalling part 234 during the loading procedure.

The journalling part 234 has a through circular opening 207 receiving a shaft 208 to rotatably support the part 234 in a bearing relationship with the outer smooth surface of the shaft 208. The shaft 208 is supported within a mounting opening 210 in a built up portion of plate 64 such that the central axis of the shaft 208 is coincident with the axis 31 of the roll 30. The shaft 208 however, is nonrotatably fixed within the plate 64 by a key 212 inserted between two grooves each extending parallel with one another and with the axis 31 and each groove being formed along corresponding surface portions of the shaft 208 and the opening 210. The end face of the journalling part 234 opposing the plug 138 has a circular recess 216 formed concentrically with the through opening 207 and extends through s given depth in the part 234. At one end of the shaft 208 is formed a head 214 having a diameter sufficiently smaller than that of the recess 216 in order that part or all of the head be capable of being received within the given depth of the recess 216. The head 214 however, is spaced from the bottom of the recess 216 by a thrust bearing unit 218, which alternatively may be substituted for by a low friction washer made from TEFLON or a like material. Thus it should be apparent that the journalling part 234 while being retained axially on the shaft 208 is however free to rotate relative to it.

On the other end of the shaft 208 are formed threads receiving a take-up nut 220. The nut 220 when turned sufficiently acts in cooperation with a washer 224 against the compressive force of a helical spring 222 concentrically disposed about the shaft 208. The opposite end of the spring 222 not contacting the washer 224 abuts against the built-up portion of plate 64 thereby allowing the nut 220 to draw the shaft 208 to the left against the bias of the spring 222. It should be noted that the groove formed in the opening 210 receiving the key 212 is open at opposite ends thereby permitting the key 212 to move freely axially within this groove as the take-up nut is turned.

Interposed between the journalling part 234 and face 264 of the plate 64 are located a thrust bearing in the form of a low-friction washer 226, the circular head portion 229 of a reverse bias member 231 and a high friction washer 230. The reverse bias member also has a radially extending arm 228 and is preferably made of metal. Each of these interposed elements has a through opening into which the shaft 208 is received in rotatable bearing engagement therewith. When the take-up nut is sufficiently tightened, the right face of the high friction washer 230 is drawn into surface contact with the opposing outer face of the journalling part 234, and the opposite left face of the washer 230 is drawn into surface contact with the opposing right face of the circular head portion 229 of the biasing member 231. Additionally, the left face of the head portion 229 is drawn into surface contact with the opposing right face of the thrust bearing 226 and the opposite left face of the thrust bearing 264 is drawn into surface contact with the opposing face 264 of the plate 64. Further the force clamping these elements together passes through the spring 222 so that the force urging the coengaging surfaces toward one another, and determining the frictional coupling capacity between the left face of the part 234 and the right face of the head portion 229, may be selectively increased or decreased by rotating the nut 220 on the shaft 208. The circular head portion 229 of the member 231 is relatively strongly frictionally coupled to the journalling part 234 by the washer 230 because the washer 230 is formed from a material having a high coefficient of friction. It should be appreciated however that only a very weak, if any, frictional coupling occurs between the fixed face 264 of the plate 64 and the left face of the circular portion 229 because the thrust bearing 226, which as illustrated in the form of a low friction washer made from TEFLON or a like material, allows the contacting faces to slide relative to one another when only a small torque appears across them. Alternatively, the bearing 226 could take the form of a thrust bearing unit having rollers or balls to provide this low friction sliding capability.

At the end of the arm 228 of the reverse bias member is an opening 240 or other suitable attachment means which connects a free end of a spring 242 to the arm 228. The spring 242 at its opposite end is secured to depending structure 364 of the plate 64 spaced forwardly of the arm 228 toward the take-up roll 32. An opening or other like connecting means fixes the spring opposite end to the depending structure 364. The spacing between the at-rest position of the arm 228, shown accordingly in FIG. 4, and the structure 364 is approximately equal to the length of the spring 242 in its normal unexpanded condition. The spring 242 is a commonly known steel helical tension spring capable of being elongated when pulled axially to apply a torque to the reverse bias member 231.

In use, the reverse bias arm 228 as shown in FIG. 5 operates between its at-rest or vertical position shown in solid line and a limited position represented by the dotted lines, which is spaced forwardly on the neutral position in the direction of unwinding movement of the supply roll. During an advancement paper 34 is pulled onto the take-up roll 32 from the supply roll 30 in the direction labelled 35. The pulling of the paper 34 rotates the supply roll in the direction labelled A. Since the journalling part 234 and the plug 138 are rotatably coupled with one another by the pins 150, the part 234 therefore rotates in uniform with the roll 30 in the A direction. The head portion 229 of the bias member 231 is frictionally held fixed to the journalling part 234 during initial movement of the arm 228 from its neutral position and therefore the bias member 231 rotates with the part 234 until its arm 228 contacts the stop 464 fixed to and supported by the plate 64. The stop 464 is positioned relative to the arm 228 so that the arm 228 is capable of swinging an arc of about 15 to 20 degrees before being stopped. The initial movement of the arm bias member is achieved because the torque exerted on the bias member by its spring 242 is less than necessary to overcome the frictional torque transferred to it through the friction washer 230. However, once the arm 228 engages the stop 464, the journalling part 234 will rotate relative to the bias member and this relative rotation will be accompanied by relative slippage between either the coengaging faces of the friction washer 230 and the bias member 231 or the coengaging faces of the friction washer 230 and the journalling part 234 to create a frictional torque opposing rotation of the supply roll in the unwinding direction. That is, a frictional drag is applied to its supply roll which in turn applies a tension force to the paper existing between the supply roll and the take-up roll. The amount of drag created by the brake 200 may be increased or decreased by selectively rotating the take-up nut 220 to vary the amount of normal force acting on the frictionally engaged surfaces and urging them toward one another.

When the advancing movement of the paper 34 stops, as a result of stopping the motor 74, the arm 228 is positioned at its extended position abutting the stop 464 and the spring 242 is stretched beyond its normal at-rest length. With the rotation of the motor 74 now stopped, the head portion of the bias member 231 again becomes frictionally held to the journalling part 234 and the arm 228 acting through the head portion 229 applies a reverse bias torque to the roll 30 in the B direction shown in FIG. 5. In so doing, the paper 34 is tensioned and is held stationary relative to the support surface 22 against forces stored between the paper on the surface 22 and the rotor of the motor 74 and tending to pull the paper forwardly from the supply roll.

It will of course be understood that various changes may be made in the brake applied to the supply roll without departing from the broader aspects of the invention. For example, it is contemplated that various different means may be used to provide an adjustable force holding together the two frictional surfaces which slide relative to one another to create a tension in the paper during the major portion of an advancement and likewise various different means may be used for biasing the bias member to yieldingly resist its rotational movement away from its neutral position to its limited position. For instance, it is possible that in some embodiments a single combined compression and torsion spring may be used to both urge the friction surfaces toward one another and to yieldingly resist torsional movement of the reverse bias member from its neutral position. Also, as explained hereinafter in connection with FIG. 6, it is contemplated that a brake other than a friction brake may be used in cooperation with the supply roll.

Referring to FIG. 6 the plotter there shown is identical to that of FIGS. 1 and 5 except for having an electrical brake 270 applied to the supply roll 30 in place of the previously illustrated friction brake 200. In this the case the journalling part 234 has nonrotatably fixed to it a support shaft 236 which is rotatably supported by the frame (not shown) of the plotter. Connected with the shaft 236 is the rotor of the electrical brake 270 which is electrically energizable to exert a variable reverse torque on the shaft 236 resisting withdrawing movement of the paper from the supply roll 30. The energization of the brake 270 is controlled by the control unit 69 in response to a sensor 272 which senses the diameter of the supply roll 30. This control is such that as the diameter of the supply roll 30 decreases the reverse torque applied by the brake 270 to the shaft 236 is also decreased. Therefore, the tension force applied to the paper by the brake 270 remains substantially constant despite changes in the diameter of the supply roll.

I claim:

1. A friction brake for use in a device advancing sheet material from a supply roll onto a take-up roll, said brake comprising:

a support;
   a shaft having a longitudinally extending central axis and mounted in said support;
   a journalling part supported by said shaft and adapted to be nonrotatably connected with one end of a supply roll such as aforesaid with said shaft aligned with the axis of said supply roll so that said journalling part rotates with said supply roll;
   a reverse bias member rotatably supported on said shaft;
   a friction member supported on said shaft between said journalling part and said reverse bias member;
   said reverse bias member being frictionally drivingly connected with said journalling part through said friction member with the driving connection including at least one pair of frictionally coengaging surfaces orthogonal to said shaft;
   means for urging said pair of frictionally coengaging surfaces toward one another;
   means for resiliently resisting rotation of said reverse bias member in one direction from a given neutral position relative to said support, said one direction being the direction in which said supply roll rotates relative to the axis of said shaft as sheet material is pulled from it; and
   a means for limiting the movement of said reverse bias member in said one direction from said neutral position.

2. A friction brake for use in a device advancing sheet material from a supply roll onto a take-up roll, said brake comprising:

a shaft having a longitudinally extending central axis and being slidably positioned within an opening in a support and having at one end axial retention means and at its other end a means axially biasing said shaft in the direction from said one end toward said other end;
   a journalling part rotatably supported on said shaft adjacent said axial retention means and having an outer face oriented orthogonally to e aid shaft axis, said journalling part being adapted to be nonrotatably connected with one end of a supply roll such as aforesaid with said shaft aligned with the axis of said supply roll so that said journalling part rotates with said supply roll;
   a reverse bias member rotatably supported on said shaft and having opposed first and second faces extending orthogonally to said shaft axis;

a friction member rotatably supported on said shaft and having third and fourth faces extending orthogonally to said shaft axis, said friction member third face being engagable with said journalling part outer face and said friction member fourth face being engagable with said reverse bias member first face;

a bearing member positioned adjacent said support and being engagable with said reverse bias member second face; and means for resiliently resisting rotation of said reverse bias member in one direction from a given neutral position, said one direction being the direction in which said supply roll rotates relative to said shaft as sheet material is pulled from it.

3. A friction brake as defined in claim 2 wherein said bearing member is rotatably supported on said shaft and has a fifth face for said engagement with said reverse bias member second face and has a sixth face engagable with said support.

4. A friction brake as defined in claim 3 wherein said bearing member is a washer made from a low friction material; said friction member is a friction washer made from a material having a high coefficient of friction; and said reverse bias member is made of metal.

5. A friction brake as defined in claim 2 wherein said reverse bias member has a head portion with a through opening for receiving said shaft and which head portion provides said first and second faces.

6. A friction brake as defined in claim 5 wherein said reverse bias member also includes an arm extending radially outwardly from said head portion, and a spring connected between said arm and said support to resiliently resist movement of said reverse bias member from said neutral position in said one direction of movement.

7. A friction brake as defined in claim 6 wherein said shaft at said other end is threaded and said means for axially biasing said shaft includes an adjustment nut threaded onto said shaft and a compression spring concentrically disposed about said shaft and working between said adjustment nut and said support.

8. A friction brake as defined in claim 7 wherein said shaft is nonrotatably mounted within said support opening by a key received in corresponding grooves formed in each of said support opening and said shaft.

9. A friction brake as defined in claim 2 wherein said journalling part has an inner face disposed adjacent said shaft retention means;

said journalling part having a recess extending outwardly from said inner face through a given depth and being concentric with said shaft axis; and wherein said journalling part has an opening communicating from said outer face through to said recess.

10. A friction brake as defined in claim 9 wherein said axial retention means is an enlarged head having a diameter sufficient to be received within said recess; and wherein said head is at least partially received within said recess.

11. A friction brake as defined in claim 10 wherein thrust bearings are interposed between the bottom of said recess and said head.

12. A friction brake as defined in claim 2 wherein said bearing member is a washer made from a low friction material said friction member is a friction washer made from a material having a high coefficient of friction.

13. In a progressive plotter where sheet material is advanced from a supply roll to a take-up roll, the combination comprising:

a table providing a support surface;

means supporting a take-up roll of paper and a supply roll of paper adjacent said support surface so that the paper passes from said supply roll over said support surface to said take-up roll;

a take-up motor for rotating said take-up roll;

a sensor sensing the displacement of the paper relative to said support surface during a paper advancement;

a control means responsive to said sensor for stopping said take-up motor at the end of an advancement; and a brake releasably coupled with said supply roll by friction means for applying a reverse bias to said supply roll during an advancement to resist unwinding of the paper from said supply roll and to tension the paper existing between said supply roll and said take-up roll, and for continuing to apply a reverse bias to said supply roll at the end of an advancement after said take-up motor is stopped.

14. The combination defined in claim 13 further characterized by said brake being a friction brake having a shaft supported by the frame of said plotter with its longitudinal axis aligned with said supply roll;

a journalling part supported on said shaft adjacent the adjacent end of said supply roll and releasably connected with said supply roll for radially supporting said adjacent end of said supply roll and for rotation with it;

a reverse bias member rotatably supported on said shaft and having a head portion surrounding said shaft and a radially outwardly extending arm portion;

said friction means providing a pair of coengaging friction surfaces arranged in a plane orthogonal to said shaft between said reverse bias member and said journalling part with said friction surfaces being so related to said reverse bias member and said journalling part that during rotation of said supply roll one surface is fixed to and rotates with said supply roll and the other surface is fixed to the reverse bias member;

a means for urging said coengaging friction surfaces toward one another;

means for spring biasing said reverse bias member to a neutral position relative to said frame and for yieldingly resisting its movement away from said neutral position in the direction of unwinding rotation of said supply roll; and a means for limiting said movement of said reverse biasing member away from said neutral position.

15. The combination defined in claim 14 further characterized by said means for urging said two coengaging friction surfaces toward one another including means for adjusting the force by which said coengaging friction surfaces are urged toward one another.

16. In a progressive plotter having unidirectional paper movement between a supply roll and a take-up roll, a friction brake associated with said supply roll which friction brake comprises:

a shaft having at one end a head and being threaded at its other end; said shaft threaded end passing through an opening in a support plate and being nonrotatably yet slidingly supported within said opening;

a journalling part rotatably supported on said shaft between said head and said support plate, said journalling part having means by which it may be selectively coupled to a plug inserted within a supply roll;

a friction washer rotatably supported on said shaft and being interposed between said journalling part and said support plate;

a reverse bias arm having at one end a circular portion rotatably supported on said shaft and being connected at its other end to said support plate by a tension spring;

a thrust bearing interposed between said reverse bias arm circular portion and said support plate;

a compression spring located adjacent said threaded end of said shaft and being oriented coaxially about said shaft;

a take-up nut and washer concentrically supported on said threaded end of said shaft and limit means cooperating with said reverse bias arm to limit its rotation; and wherein said compression spring is interposed between said support plate and said take-up nut and washer.

17. In a progressive plotter, a friction brake as defined in claim 16 further characterized by said journalling part having a recess located adjacent one end thereof and receiving said shaft head therein.

18. In a progressive plotter, a friction brake as defined in claim 17 further characterized by a thrust bearing being interposed between said shaft head and the bottom of said recess and wherein said friction brake acts to create a drag force on said roll and said tension spring provides a reverse bias to a supply roll after it ceases to rotate.

* * * * *